Feb. 8, 1949.  D. H. CLEWELL ET AL  2,460,873
VACUUM GAUGE
Filed Jan. 1, 1945
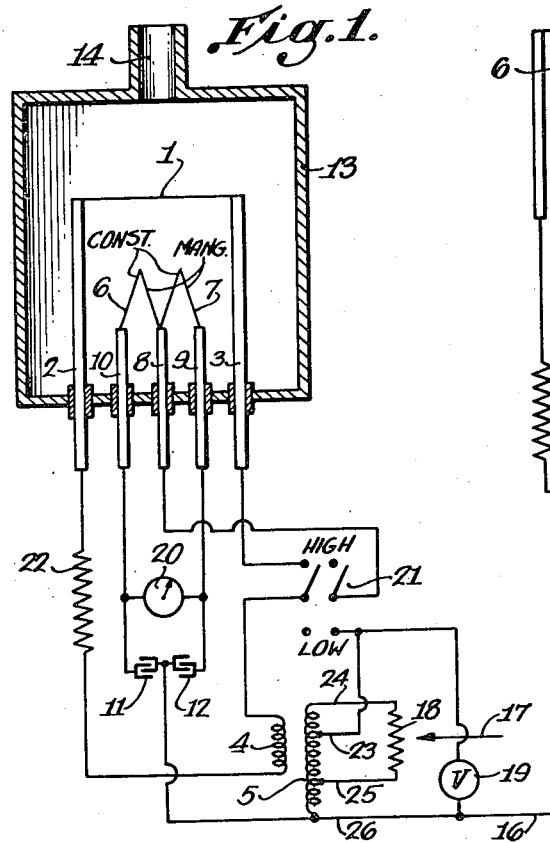
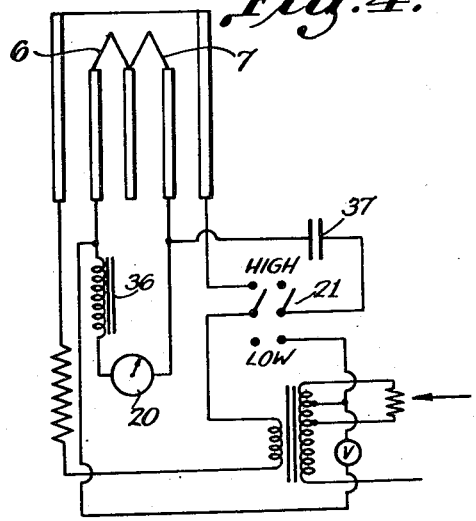
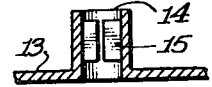
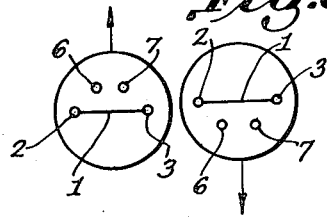
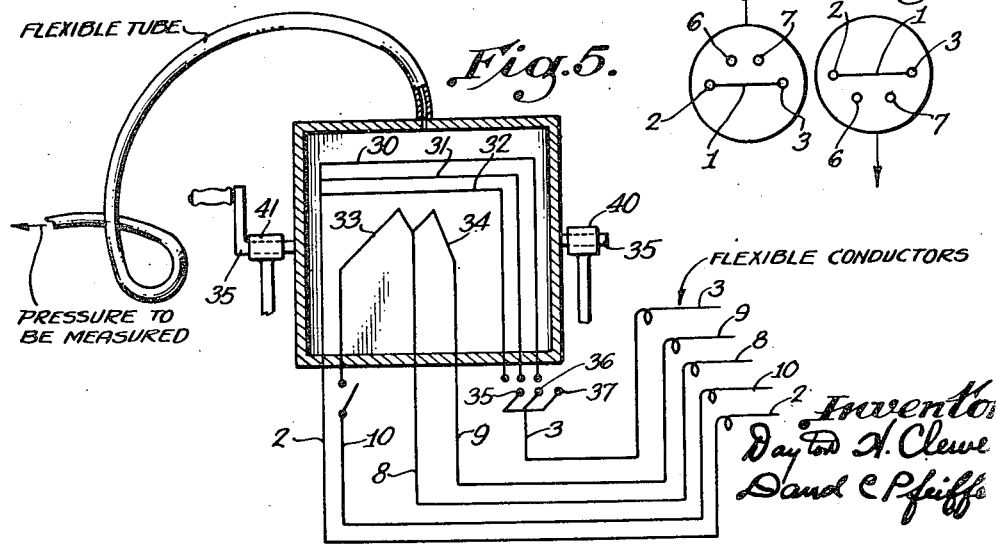

Patented Feb. 8, 1949

2,460,873

UNITED STATES PATENT OFFICE 2,460,873

VACUUM GAUGE

Dayton H. Clewell and David C. Pfeiffer, Dallas, Tex.

Application January 1, 1945, Serial No. 570,970

4 Claims. (Cl. 73—399)

Our invention relates to a method and means of measuring the pressure of gases or vapors at pressures substantially less than atmospheric.

Recent advancement in the application of vacuum systems to industrial and commercial processes has made it desirable to provide a means of measuring with precision and rapidity the pressures attained in such vacuum systems. These pressures range in magnitude from 10,000 microns down to the least measurable pressure. However, in most large scale applications of vacuum techniques pressures less than 0.001 microns are seldom encountered. There are many methods available for measuring these pressures, the Pirani gauge, the ionization gauge, the McLeod gauge and the Knudsen gauge being a few of the instruments well known to those skilled in the art. However, the instruments of the prior art are deficient in that they are operable only over relatively narrow ranges of pressure and are therefore not satisfactory for many commercial applications.

The primary object of our invention is to provide a single instrument capable of measuring rapidly and precisely the pressure of a gas or vapor over a wide range of pressures.

Another object of the invention is to provide a pressure measuring instrument which requires a minimum of calibration and adjustment and operates solely from the alternating current power mains.

Still another object of the invention is to provide means of using changes in the heat conductivity of a gas or vapor as a measure of changes in pressure of the gas or vapor.

It is well known that the heat conductivity of a gas or vapor varies more or less rapidly with changes in pressure. The Pirani gauge, wherein the fluctuation in temperature of a filament heated by a constant electric current is used as an index of changes in the heat conductivity of the gaseous environment of the filament and hence also an index of the changes in pressure of the environment, is a well known instrument. Even with a sensitive thermocouple attached to the filament to measure small variations of its temperature the useful range of the Pirani gauge is only from one micron to several hundred microns. To extend the useful range of a pressure measuring gauge of this type, we have made use of the gaseous convection currents which are always associated with the heated filament and which, we have found, become of appreciable magnitude at about the same pressure that the filament temperature becomes insensitive to pressure.

Our invention may be best understood by reference to the drawings and the following description thereof. In the drawings:

Fig. 1 is a schematic arrangement of the elements of the pressure gauge disposed within a housing and of the electrical connections thereto, Fig. 2 is a sectional view of an orifice used to prevent rapid fluctuations in pressure from reaching the pressure gauge, Fig. 3 is a schematic representation of two possible dispositions of the thermocouples relative to the filament.

Fig. 4 is a schematic diagram of an alternate arrangement of the electrical connections to the gauge, and, Fig. 5 is a vertical section of the gauge showing how it can be mounted for rotation about a horizontal axis.

Referring to Fig. 1 a filament 1 is secured between the two electrodes 2 and 3, which are connected electrically through a current limiting resistor 22 and switch 21 in its "high" position to the low voltage secondary 4 of a small power transformer. The primary 5 of the transformer is connected to a convenient source of alternating current through the leads 16 and 17 and potentiometer 18. Thus sufficient current can be made to flow through the filament 1 to heat it several hundred degrees above its gaseous environment. At an optimum distance away from the filament are mounted two thermo-junctions 6 and 7, carried by the three electrodes, 8, 9, and 10. These junctions are made by connecting together any two dissimilar metals, such as for example constantan and manganin. The junctions are connected in series-aiding relationship and changes in the temperature of the junctions are indicated by changes in the thermoelectric current flowing through the meter or galvanometer 20, connected to the two outer electrodes 9 and 10. The galvanometer 20 may, for example, be a low resistance microammeter.

Gaseous convection currents produced by the heated filament 1 transport heat to the junctions 6 and 7 in proportion to the pressure of the gaseous atmosphere.

We have found that if the filament is about .004 inch in diameter, and if the thermocouple wires are also .004 inch in diameter the optimum spacing is .16 inch for a pressure range of from 500 to 3,000 microns. Under these conditions a uniform relationship exists between pressure changes and current changes generated by the thermo-couples. When plotted on semi-logarithmic paper, the pressure as a function of thermocouple current is a straight line between 500 and 3,000 microns, curving at each end of this pressure range so that greater pressure changes are necessary for increasing current changes.

We have observed that increasing this spacing shifts this curve to a higher pressure region thus placing the uniform relationship in a higher pressure range. We have also observed that the relative position of the filament and the heat sensitive means affects operation. Placing the heated filament directly below the thermocouple increases the amount of heat convected to the thermocouples by any gases present. If the tube is revolved 180° so as to place the filament directly above the thermocouple, this convection effect is minimized. See Fig. 3.

The effective pressure range of this gauge can be increased by applying our observations on the relative spacing of the filament and thermocouples. For example, as shown in Figure 5, instead of a single filament, several filament wires 30, 31, 32, can be used, each at a different distance from the thermocouples 33 and 34. For each filament there will be a different pressure range over which the transfer of heat from said filament to the thermocouples will be linearly proportional to the pressure of the gaseous environment of the system. By making these several pressure ranges overlap one another it is obvious that the total range of the instrument can be made quite large. Each filament can be heated independently of the other filaments by providing separate switches 35, 36, and 37, to connect respectively filaments 32, 31 and 30 to the transformer secondary 4, or all the filaments may be heated simultaneously by connecting them all in parallel. The latter method of operation is the most convenient but the former permits the attainment of a maximum of sensitivity to small changes in pressure. It is also obvious that a single filament could be used with a plurality of thermocouples, each thermocouple being spaced a different distance from the filament, to accomplish the same wide range of operation that is accomplished with the aforementioned plurality of filaments. Thus in Fig. 3 thermocouple 6 need not be the same distance from the filament 1 as is thermocouple 7.

To extend the sensitivity of the pressure gauge to low pressure ranges we have found it most convenient to employ still another method of operation which will now be described with reference to Fig. 1. For operation in the low pressure range the switch 21 is placed in the "low" position thereby disconnecting the filament 1 from the secondary 4 of the transformer. Thus the filament plays no role in the low pressure range. A heating current now flows through the thermocouples 6 and 7. The path of the current starts at the tap 23 of the primary winding 5 of the transformer, continues through the switch 21 to the electrode 8 where it divides into two equal portions, one portion flowing through the thermocouple 6, the electrode 10, and the condenser 11, while the other portion flows through the thermocouple 7, electrode 9, and condenser 12. The two portions unite in the conductor common to the condensers 11 and 12, and return to the primary of the transformer via tap 26. Since the condensers 11 and 12 are of equal capacity and constitute nearly all of the impedance offered to the flow of current the two terminals of the galvanometer 20 are at equal A. C. potentials and no alternating current flows through the galvanometer 20. However, the heating effect caused by the alternating current flowing through the thermocouples 6 and 7 generates a thermal E. M. F. which causes direct current to flow through the galvanometer 20. This direct current flow is a result of the fact that the two thermocouples are connected in series-aiding with respect to the galvanometer 20.

The current flowing in the galvanometer is a function of the temperature of the thermocouples which in turn is a function of the pressure of the gaseous environment within the housing 13. The galvanometer current is sensitive to changes in pressure between ½ and 500 microns with this mode of operation. It will be noted that with the switch 21 in the "low" position the galvanometer current increases with decreasing pressure while with the switch 21 in the high position the galvanometer current increases with increasing pressure.

Although the condensers 11 and 12 are preferred because they are non-dissipative impedances it is understood that they may be replaced by other impedances such as resistors or inductors.

Fig. 1 depicts a preferred embodiment of our invention in that the apparatus is adapted to readily measure pressure in either of the two ranges, conversion from one range to the other being accomplished by operation of the two-position two circuit switch 21. In the upward position (marked high) of the switch the transformer secondary 4 is connected to the filament 1, which is made preferably of platinum or some other inert metal. It will also be noted that in the upward position of switch 21 no voltage is applied to the bridge consisting of the two junctions 6 and 7 and two condensers 11 and 12. Thus the apparatus is in the proper condition for measuring pressures in the higher range. Operating the switch 21 to its other position (marked low) removes the voltage from the filament 1 and applies voltage to the above mentioned bridge circuit for measurement of pressures in the lower range.

The preferred embodiment also provides means of rotating the housing 13 about a horizontal axis 35, supported in bearings 40 and 41, in order that either of the relative dispositions of the thermocouples with respect to the filament shown in Fig. 3 can be obtained or likewise any intermediate position. This rotational means provides for the adjustment of sensitivity to the desired value for any particular range of pressure.

The filament 1 and junctions 6 and 7 are mounted within a vacuum-tight enclosure 13 having an opening 14, by means of which the space inside of enclosure 13 may be connected to any system in which the pressure is to be measured. The opening 14 is sufficiently large to permit a rapid establishment of pressure equilibrium between the inside of enclosures 13 and the system to which it is connected. There are many occasions, however, when the pressure in a system to be measured fluctuates in an erratic manner and it becomes desirable to measure the average pressure of the system. This can be accomplished readily with our apparatus by placing a restriction or orifice such as a short length of fine capillary tubing 15 in opening 14, as shown in Fig. 2. Such a restriction offers sufficient resistance to the flow of gas in and out of the enclosure 13 that the pressure in the enclosure 13 fluctuates much less than it does in the system to which the enclosure is connected. Actually the pressure in said enclosure will assume an average value of the pressure of the system to which it is connected and it will be this average pressure that will be measured by our apparatus.

When the leads 16 and 17 of the transformer primary 5 are connected to ordinary sources of power the voltages applied to the filament 1 and the bridge circuit composed of junctions 6 and 7 and condensers 11 and 12 will fluctuate in accordance with fluctuations of the voltage of the source of power. The potentiometer 18 connected to taps 25 and 24 of the primary winding 5 of the transformer is used to compensate for variations in the voltage of the power source. The adjustable contact of the potentiometer constitutes one lead 17 to the source of power and is adjusted until the voltmeter 19 reads a predetermined value, whereupon the voltage across the primary and secondary windings of the transformer will also be a predetermined value. To those skilled in the art other methods of regulating the voltage are obvious, but is intended that all methods of regulating voltage to our apparatus are within the scope of this invention.

One common method of measuring pressures in the range for which our apparatus is suitable consists of obtaining a sample of the gas or vapor at the pressure to be determined, compressing the sample to a known small volume and deducing the original pressure from a measurement of the pressure of the compressed gas. It is obvious that this procedure is unworkable when any of the components of the sample are condensable at the temperature at which the measurement is made. However, since methods based on the ability of a gas to transport heat do not involve compression of the sample it is clear that our method is as adaptable to the measurement of condensable vapors as to noncondensable gases.

It will be observed that we have provided means for extending the measurement of the pressure of condensable as well as non-condensable gases to upwards of 10,000 microns.

It is understood that various modifications in the method and means here disclosed may be made. In Fig. 1, for example, we have shown two thermo-junctions, but one or several could just as well be used to indicate the transport of heat from the filament 1. In order that the thermo-junctions or junctions be usable in the low pressure range, the bridge arrangement of Fig. 1 is particularly convenient and requires that an even number of thermo-junctions be used to maintain balance of the bridge to the alternating current used to heat the junctions.

Another circuit arrangement which we have found to be convenient, shown in Figure 4, uses an inductance 36 in series with the thermo-junctions 6 and 7 and meter 20; and then uses a capacitor 37 in series with the thermo-junctions and source of alternating current with the switch 21 in the "low" position whereby the alternating current is prevented from flowing through the meter 20, and at the same time the direct current generated by the thermo-junctions 6 and 7 is forced to register on the meter 20.

It will also be evident that heat sensitive means other than thermo-junctions may be disposed in space near the filament 1 to indicate the transport of heat away from said filament. For example, a metal whose electrical resistance varies with temperature could readily replace the thermo-junctions.

Various other modification of our invention will be apparent to those skilled in the art, and our invention should not be limited except as indicated in the appended claims.

We claim:

1. An apparatus for measuring the pressure of gases and vapors including a plurality of spaced filaments, means for selectively heating said filaments electrically, a plurality of thermo-junctions spaced at various distances from the filaments whereby the heat transferred from the filaments to the thermo-junctions will be a measure of the gaseous pressure of the environment of said filaments and said thermo-junctions over a wide range of pressure and means of measuring the voltage generated by the thermo-junctions when they are heated.

2. An apparatus for measuring the pressure of gases and vapors including a filament, two thermo-junctions spaced optimum distances from said filament, two electrical impedances, a regulatable source of alternating current, an electrical meter sensitive to direct current, and switching means, said thermo-junctions and electrical impedances connected electrically so as to constitute the four arms of a balanced Wheatstone bridge, said meter connected to the output of the bridge, said switching means adapted to connect the source of alternating current alternatively to the filament and to the input to the bridge whereby the direct current flowing in the electrical meter will be a measure of the pressure of the gaseous environment of said filament and thermo-junctions over a wide range of pressure.

3. An apparatus for measuring the pressure of gases and vapor including a filament, two thermo-junctions spaced optimum distances from said filament, two equal electrical impedances, a regulatable source of alternating current, an electrical meter sensitive to direct current, and switching means, said thermo-junctions connected in series-aiding with the electrical meter, said impedances also connected in series with the electrical meter and said switching means adapted to connect the source of alternating current alternatively with the two terminals of the filament and the two terminals common respectively to the thermo-junctions and the impedances whereby the direct current flowing in the electrical meter is a measure of the pressure of the gaseous environment of the filament and thermo-junctions.

4. An apparatus for measuring the pressure of gases and vapors including a filament, a plurality of thermo-junctions spaced various distances from said filament, two equal electrical impedances, a source of alternating current, an electrical meter sensitive to direct current and switching means, said thermo-junctions connected in series-aiding with the electrical meter, said impedances also connected in series with the electrical meter, said switching means adapted to connect the source of alternating current alternatively with the two terminals of the filament and the two terminals which, respectively, are the point common to the two electrical impedances and the point in the thermo-junction circuit midway between said meter terminals whereby no alternating current flows in said meter and the direct current in said meter is a measure of the pressure of the gaseous environment of the filament and thermo-junctions.

DAYTON H. CLEWELL.
DAVID C. PFEIFFER.

(References on following page)

REFERENCES CITED

The following references are of record in the file of this patent:

UNITED STATES PATENTS

| Number | Name | Date |
|---|---|---|
| 1,506,003 | Kambayashi | Aug. 26, 1924 |
| 1,996,943 | Wile | Apr. 9, 1935 |
| 2,315,672 | Tawney et al. | Apr. 6, 1943 |
| 2,348,607 | Clark | May 9, 1944 |

FOREIGN PATENTS

| Number | Country | Date |
|---|---|---|
| 291,834 | Great Britain | May 22, 1928 |